United States Patent
Zafar et al.

(10) Patent No.: US 10,853,788 B1
(45) Date of Patent: Dec. 1, 2020

(54) SYSTEMS AND METHODS FOR ENHANCED SHOPPING USING A MOBILE DEVICE

(71) Applicant: JPMorgan Chase Bank, N.A., New York, NY (US)

(72) Inventors: Shadman Zafar, Plano, TX (US); Michael Naggar, Orinda, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 287 days.

(21) Appl. No.: 15/186,934

(22) Filed: Jun. 20, 2016

Related U.S. Application Data

(60) Provisional application No. 62/182,171, filed on Jun. 19, 2015.

(51) Int. Cl.
*G06Q 20/14* (2012.01)
*G06Q 30/04* (2012.01)
*G06Q 20/32* (2012.01)
*G06Q 20/38* (2012.01)
*G06Q 20/40* (2012.01)
*H04W 76/10* (2018.01)

(52) U.S. Cl.
CPC ....... *G06Q 20/3223* (2013.01); *G06Q 20/382* (2013.01); *G06Q 20/40* (2013.01); *H04W 76/10* (2018.02)

(58) Field of Classification Search
USPC .......................................................... 705/40
See application file for complete search history.

(56) References Cited

U.S. PATENT DOCUMENTS

| | | | | |
|---|---|---|---|---|
| 2002/0052853 A1* | 5/2002 | Munoz | ............... | G06Q 20/02 705/79 |
| 2008/0306835 A1* | 12/2008 | Agura | ............... | G06Q 10/107 705/26.8 |
| 2008/0319914 A1* | 12/2008 | Carrott | ............... | G06Q 20/02 705/75 |
| 2010/0012715 A1* | 1/2010 | Williams | ............... | G06Q 20/32 235/375 |
| 2015/0127428 A1* | 5/2015 | Gharachorloo | .... | G06Q 30/0283 705/7.35 |
| 2015/0161608 A1* | 6/2015 | Gilbert | ............... | G06Q 20/4014 705/44 |

* cited by examiner

*Primary Examiner* — Hai Tran
(74) *Attorney, Agent, or Firm* — Greenberg Traurig LLP

(57) ABSTRACT

Systems and methods for enhanced shopping using a mobile device are disclosed. In one embodiment, a method for enhanced shopping using a mobile device may include (1) a mobile application executed by a mobile electronic device associating with a merchant system, the mobile electronic device comprising at least one computer processor, a memory, an optical input, and a display; (2) the mobile application receiving an item identifier associated with an item; (3) the mobile application receiving item data for the item from the merchant system based on the item identifier; (4) the mobile application receiving purchase confirmation for the item; and (5) the mobile application communicating payment information for the item to the merchant system.

17 Claims, 5 Drawing Sheets

SYSTEMS AND METHODS FOR ENHANCED SHOPPING USING A MOBILE DEVICE

RELATED APPLICATIONS

The present application claims priority to U.S. Provisional Patent Application Ser. No. 62/182,171, filed Jun. 19, 2015, the disclosure of which is hereby incorporated, by reference, in its entirety.

The present application is related to U.S. Provisional Patent Application Ser. No. 62/182,155, filed Jun. 19, 2015, U.S. patent application Ser. No. 14/699,511, filed Apr. 29, 2015; U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014. The disclosure of each of these documents is hereby incorporated, by reference, in its entirety.

BACKGROUND OF THE INVENTION

1. Field of the Invention

The present invention generally relates to payment processing, and, more specifically, to systems and methods for enhanced shopping using a mobile device.

2. Description of the Related Art

Mobile electronic devices are ubiquitous. Today, a mobile electronic device serves as a telephone, camera, calculator, web browser, information source, etc. These device provide the user with the ability to retrieve information at almost any time and in almost any location.

SUMMARY OF THE INVENTION

Systems and methods for enhanced shopping using a mobile device are disclosed. In one embodiment, a method for enhanced shopping using a mobile device, comprising: (1) a mobile application executed by a mobile electronic device associating with a merchant system, the mobile electronic device comprising at least one computer processor, a memory, an optical input, and a display; (2) the mobile application receiving an item identifier associated with an item; (3) the mobile application receiving item data for the item from the merchant system based on the item identifier; (4) the mobile application receiving purchase confirmation for the item; and (5) the mobile application communicating payment information for the item to the merchant system.

In one embodiment, the step of associating with a merchant system may include the mobile application establishing a communication link with the merchant system. In another embodiment, the step of associating with a merchant system may include the mobile application registering with the merchant system. In still another embodiment, the step of associating with a merchant system may include the mobile application logging into an account with the merchant system.

In one embodiment, the step of the mobile application communicating payment information for the item to the merchant system may include the mobile application communicating a payment token to the merchant system. In another embodiment, the step of the mobile application communicating payment information for the item to the merchant system may include the mobile application communicating a payment confirmation to the merchant system.

According to another embodiment, a method for enhanced shopping using a mobile device may include (1) a merchant system comprising at least one computer processor, a memory associating with a mobile application executed by a mobile electronic device; (2) the merchant system receiving, from the mobile application, an identifier for an one item; (3) the merchant system providing item data for the item to the mobile application; (4) the merchant system receiving purchase confirmation for the item from the mobile application; and (5) the merchant system receiving payment information for the item from the mobile application.

In one embodiment, the step of associating with a mobile application may include the merchant establishing a communication link with the mobile application. In another embodiment, the step of associating with a mobile application may include the merchant system receiving a registration request from the mobile application. In still another embodiment, the step of associating with a mobile application may include the merchant system receiving notification that the mobile application has logged into an account with the merchant system.

In one embodiment, the step of the receiving payment information for the item from the mobile application may include the merchant system receiving a payment token from the mobile application. In another embodiment, the step of receiving payment information for the item from the mobile application may include the merchant system receiving a payment confirmation from the mobile application.

In one embodiment, the method may further include the merchant system deactivating a security feature for the item. The security feature may include a RFID tag that is associated with the item.

According to one embodiment, a system enhanced shopping using a mobile device may include a merchant system that includes at least one computer processor, a memory associating with a mobile application executed by a mobile electronic device; an application executed by a mobile electronic device that may include at least one computer processor, a memory, an optical input, and a display; and at least one database comprising item information for a plurality of items offered for sale by the merchant. The mobile application may associate with the merchant system; receive an item identifier associated with an item; receive item data for the item from the merchant system based on the item identifier; receive purchase confirmation for the item; and communicate payment information for the item to the merchant system.

In one embodiment, the association between the mobile application and the merchant system may include a communication link between the mobile application and the merchant system. In another embodiment, the association between the mobile application and the merchant system may be established by the mobile application registering with the merchant system. In still another embodiment, the association between the mobile application and the merchant system may be established by the mobile application logging into an account with the merchant system.

In one embodiment, the payment information may include a payment token. In another embodiment, the payment information may include payment confirmation.

In one embodiment, at least one of plurality of items may include a security feature that is deactivated when the payment information is received. The security feature may include a RF tag. In one embodiment, the merchant may add a RF tag identifier to a list of items that do not trigger a security alert after payment information is received. In another embodiment, the merchant may remove a RF tag identifier to a list of items that trigger a security alert after payment information is received.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-5.

Figure 1:
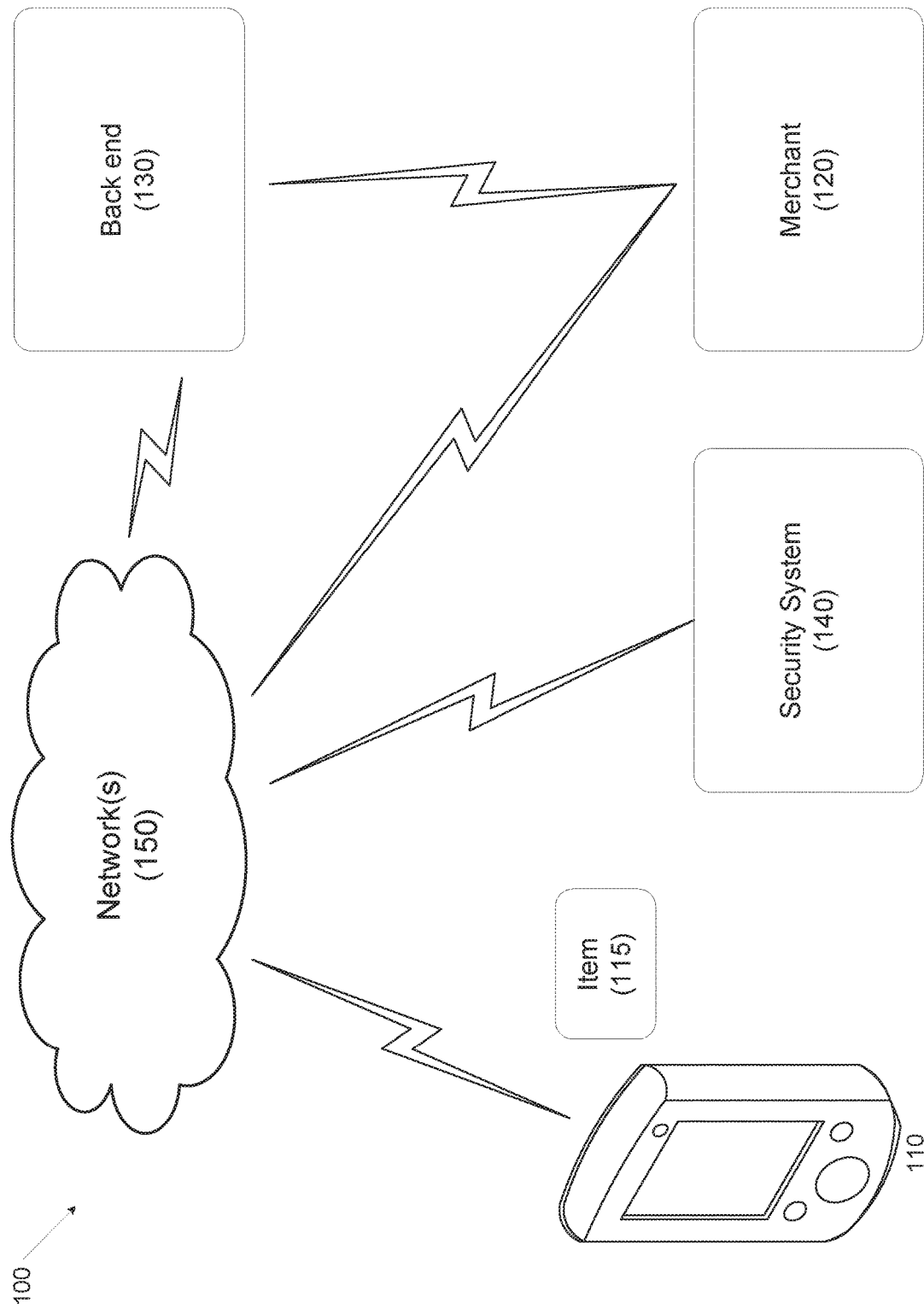
FIG. 1 depicts a system for enhanced shopping using a mobile device according to one embodiment.

Embodiments disclosed herein facilitate enhanced shopping using a mobile device. Referring to FIG. 1, a system for in-aisle shopping is disclosed according to one embodiment. System 100 may include mobile device 110, merchant location 120, back end 130, merchant security system 140, and network(s) 150. In one embodiment, one or more of mobile device 110, merchant 120, and back end 130 may communicate via network(s) 150. In addition, one or more of mobile device 110, merchant location 120, back end 130, merchant security system 140, and network(s) 150 may communicate directly via any suitable communication channel, such as WiFi, Bluetooth, NFC, IR, etc.

In one embodiment, merchant location 120 may include a beacon (e.g., for transmitting merchant information to mobile device 110), point-of-sale terminals, a web site, etc.

In one embodiment, the customer may desire to purchase item 115 using mobile device 110. In one embodiment, item 115 may be associated with one or more machine-readable codes (e.g., UPC, QR codes, etc.). In one embodiment, item 115 may further include a unique identifier tag, such as a RFID tag, that may identify the specific item.

In one embodiment, information regarding the items (e.g., pricing, inventory, unique identifiers, etc.) may be stored in one or more database (not shown) that may be local or remote. The databases may be accessible via back end 130.

Figure 2:
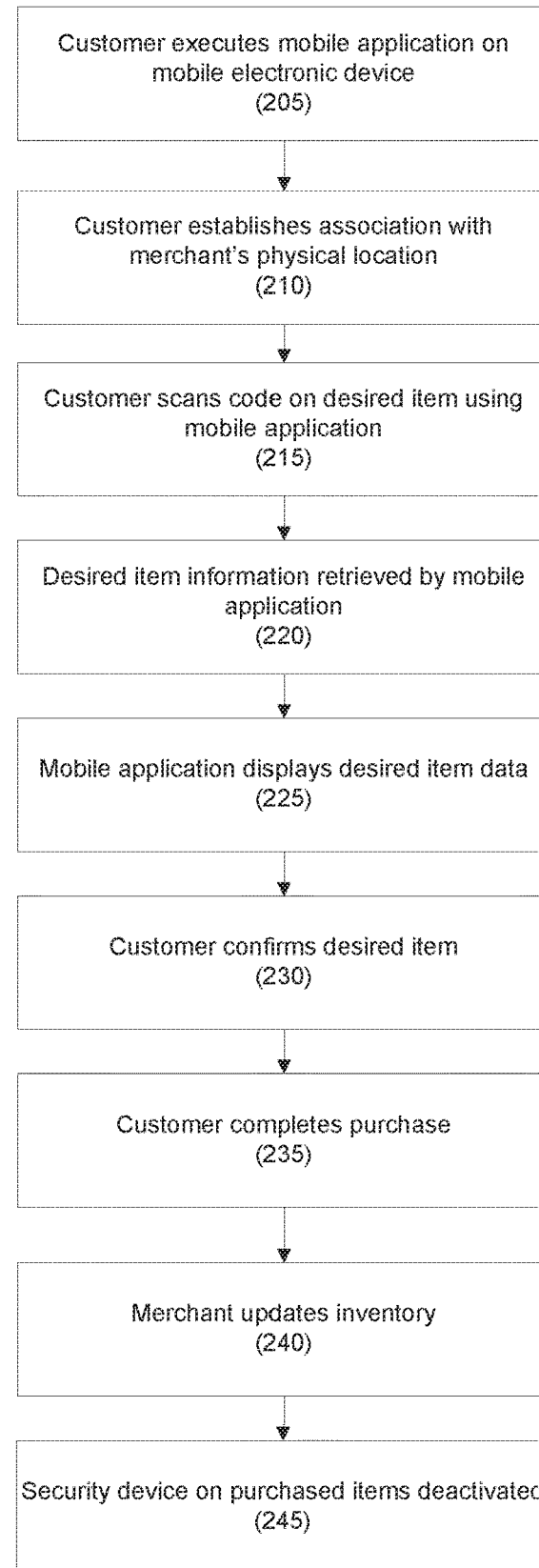
FIG. 2 depicts a method for enhanced shopping using a mobile device according to one embodiment.

Referring to FIG. 2, a method for enhanced shopping using a mobile device is disclosed according to one embodiment. In step 205, the user may execute a mobile application on the user's mobile electronic device. In one embodiment, the merchant may initiate this association by providing a beacon or other signal to a mobile device when it enters the merchant's location.

The customer may use the merchant's mobile application or website, a financial institution's mobile application or website, or a third party wallet or payment application as part of this process.

In step 210, the customer may establish an association with the merchant's physical location. For example, a customer may register or associate a mobile device and/or a mobile application with a merchant when he or she is physically present at a merchant's store. In one embodiment, the customer may use the merchant's mobile application, a financial institution's application, a third party payment application, a third party shopping application, etc. The application may detect the location of the user by GPS, beacons, etc. In another embodiment, the customer may scan a machine-readable code, such as a QR code, using the mobile application or mobile device. In yet another embodiment, the mobile application or mobile device may connect to the merchant's WiFi or other network.

In one embodiment, the customer may associate the mobile device and/or mobile application with a point of sale terminal. An example of such association is provided in U.S. Provisional Patent Application Ser. No. 62/182,155. The disclosure of this document is incorporated, by reference, in its entirety.

After the relationship is established, the customer may use the mobile device as a sort of extension of the point of sale terminal to scan items to be purchased. In on embodiment, a point of sale terminal may be associated with a single mobile device; in another embodiment, it may be associated with more than one device.

In step 215, once the association has been established, the customer may shop for desired items. When the customer selects a desired item, the customer may scan one or more machine-readable code, such as a UPC, a QR code, etc. that may be affixed, printed on a item's packaging, otherwise associated with the item, located on a shelf, etc. Any suitable code may be used as is necessary and/or desired.

In another embodiment, the image recognition may be used to identify the item. In still another embodiment, the customer may shop using a catalog. Any suitable method for identifying an item to purchase may be used as is necessary and/or desired.

If the code is not on the item, or the item is stored in a separate location (e.g., a floor model of an appliance is available but the actual item to purchase is in a warehouse, storage area, etc.), the code may be provided on a shelf, product information card, in a catalog, etc.

In one embodiment, the customer may specify a size, color, quantity, or any item information that may be requested/required.

In step 220, once the code is received by the mobile application, item data, such as a description, pricing, etc., may be retrieved from local and/or remote databases, the merchant's back end, etc. In one embodiment, the merchant may also check its inventory to make sure that the product is in stock (e.g., if the actual item to purchase is not available for scanning).

In step 225, the mobile application may then display the item data to the customer. In one embodiment, the item description, price, and any other details may be provided as is necessary and/or desired.

In one embodiment, additional information, such as unit price information (e.g., price per unit), warranty information, product reviews, alternate products, recommendations of other products, extended warranty offers, rebate information, promotions involving that or a similar item, etc. may be provided as is necessary and/or desired.

In one embodiment, shipping information (e.g., shipping cost, delivery time, etc.), delivery scheduling, etc. may be provided for the items as is necessary and/or desired.

In one embodiment, manufacturer and/or store coupons or other promotions may be presented as necessary and/or desired.

In step 230, the customer may then confirm that the item data is correct (e.g., confirm that the item is the proper item, the pricing is correct, etc.). If it is correct, in step 235, the customer may then confirm that the item is to be purchased. In one embodiment, the customer may place the item in his or her shopping cart, may request that the item be retrieved from storage, etc.

In step 235, the customer may complete the purchase for each item as the item data is confirmed. In another embodiment, the customer may continue shopping and complete the purchase for all items at the conclusion of shopping.

To complete the purchase, the customer may initiate payment through the mobile application by entering payment information, such as entering credit card information, charging an account, executing the payment through a financial institution mobile application or website, a third party payment application, mobile wallet, etc.

In step 240, after payment, the merchant may update its inventory for the product. In one embodiment, items that were in storage may be readied for the customer to pick up. For example, they may be delivered to the front of the store, may be made available at a loading dock, may be otherwise delivered, etc.

In step 245, the merchant may deactivate a security feature (e.g., an anti-theft feature) associated with the purchased items. For example, each item may be associated with a unique identifier, such as a RFID tag, that may be affixed to, or otherwise secured to, the item. This identifier may be scanned when the item is scanned, for example, in step 215. Once the items is purchased, the merchant may take an action, such as removing the unique identifier for the item from a list that may trigger an alarm or other notification. Alternately, the merchant may add the unique identifier to a list of purchased items. Other actions may be taken as are necessary and/or desired.

As the items are removed from the merchant's store, each item's unique identifier may be read. If the unique identifier is determined to be associated with an item that was not purchased, the merchant and/or customer may be so informed. For example, an alarm may sound, a notification may be sent to the merchant and/or customer, etc.

In one embodiment, a corrective action, such as verifying that the item was paid for, paying for the item, etc., may be taken.

Figure 3:
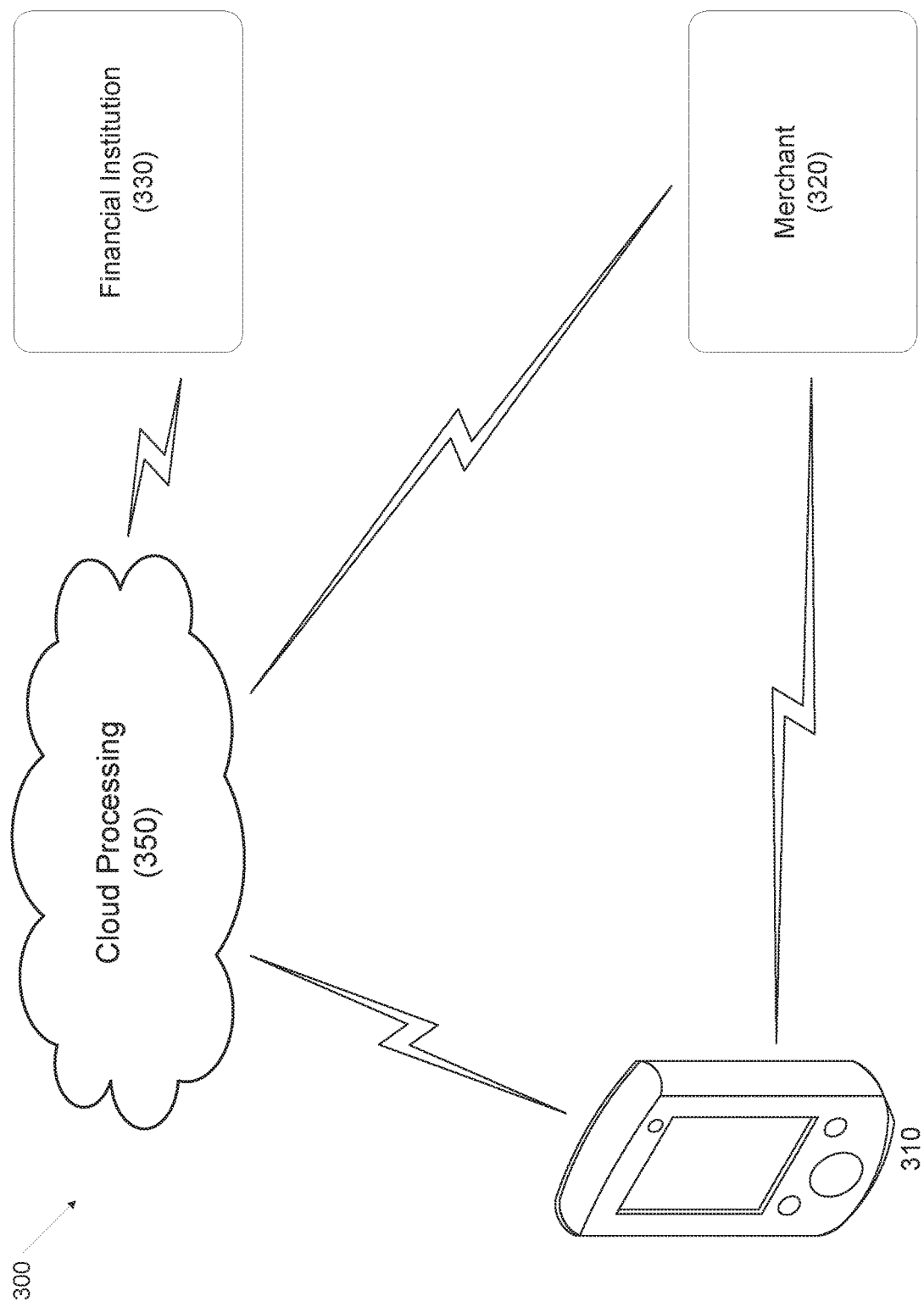
FIG. 3 depicts a system for cloud-based payment according to one embodiment.

Other embodiments disclosed herein may facilitate cloud-based payments. Referring to FIG. 3, a system for cloud-based payments is disclosed according to one embodiment. System 300 may include mobile device 310, merchant 320, financial institution 330, and cloud processing 350. In one embodiment, one or more of mobile device 310, merchant 320, financial institution 330, and cloud 340 may communicate via any suitable communication network. In addition, one or more of mobile device 310, merchant 320, financial institution 330, and cloud processing 350 may communicate directly via one or more suitable communication channel, such as WiFi, Bluetooth, NFC, IR, etc.

In one embodiment, cloud processing 350 may include processing and/or storage that may be separate from any processing performed by any of mobile device 310, merchant 320, and/or financial institution 330.

In one embodiment, the customer may desire to purchase and/or pay for an item (not shown) using mobile device 310. In one embodiment, the customer may shop using mobile device 310 by, for example, entering data for the item (e.g., UPC code, QR code, selecting from a menu, etc.) into a mobile application that is executed by mobile device 310. In another embodiment, the customer may receive item data from merchant 320, such as merchant 320's point-of-sale device, merchant 320's website, or any other suitable interface. Customer 310 may authorize financial institution 330 to make a payment for the item to merchant 320 using the mobile application.

Figure 4:
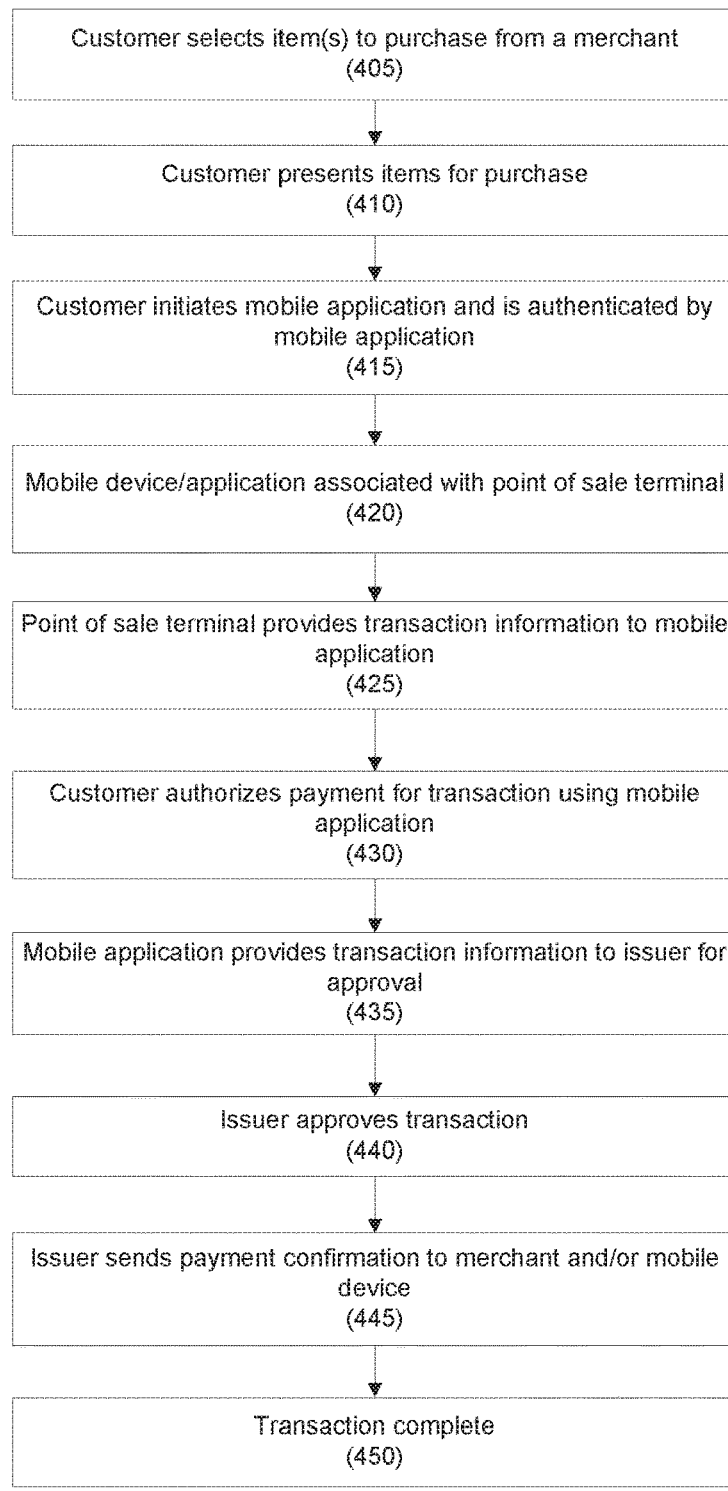
FIG. 4 depicts a method for cloud-based payment according to one embodiment.

Referring to FIG. 4, a method for cloud-based payment using a mobile device is disclosed according to one embodiment. In step 405, a customer may select one or more item for purchase from a merchant. In one embodiment, the customer may select the item(s) in person at a merchant location; in another embodiment, the customer may select the items on-line using the merchant's website, the merchant's application, etc. In another embodiment, the customer may select the items using an application that is provided by a financial institution. The financial institution's application may provide a portal to a merchant's website, may be associated with the merchant's point-of-sale device or other interface, etc.

In step 410, the customer may present the item(s) for purchase. In one embodiment, the customer may have the items scanned at a point-of-sale device. In another embodiment, the customer may add the items to an electronic shopping cart and select "checkout." Any suitable way of selecting items to purchase may be used as is necessary and/or desired.

In step 415, the customer may initiate a mobile payment application and may be authenticated by the mobile payment application. It should be noted that the execution of the mobile payment application may occur at any suitable point of the process.

The customer may use the merchant's mobile application or website, a financial institution's mobile application or website, or a third party wallet or payment application, a kiosk, etc. as part of this process.

In step 420, the customer may establish an association between the mobile payment application and the merchant. For example, a customer may register or associate a mobile device and/or a mobile application with a merchant when he or she is physically present at a merchant's store. In one embodiment, the customer may use the merchant's mobile application, a financial institution's application, a third party payment application, a third party shopping application, etc. The application may automatically detect the location of the user by GPS, beacons, WiFi networks, etc.

In one embodiment, the customer may associate, or pair, the mobile device and/or mobile application with a point of sale terminal. An example of such association is provided in U.S. Provisional Patent Application Ser. No. 62/182,155. The disclosure of this document is incorporated, by reference, in its entirety.

In step 425, the mobile payment application may receive transaction information. In one embodiment, the transaction information may be received from the merchant's point-of-sale device. In another embodiment, transaction information may be received from the merchant's website. In another embodiment, the transaction information may be received as items are identified and entered into the mobile application.

In another embodiment, the mobile payment application may receive the information in bulk, e.g., after information on all products that are part of the transaction are received.

In one embodiment, transaction information may include item information (e.g., description, quantity, price, etc.), merchant identification, a point-of-sale or other terminal identifier, a transaction identifier, etc. Other or additional information may be provided as is necessary and/or desired.

In step 430, the customer may authorize payment to the merchant using the mobile payment application. In one embodiment, the customer may select a payment account (e.g., credit card, debit card, checking, line of credit), may apply for a new financial instrument with a new credit line to use for the transaction, etc. Non-traditional transaction accounts, such as rewards accounts, home equity lines of credit, etc. may be used to conduct the transaction as is necessary and/or desired.

In step 435, the mobile payment application may provide the transaction information to the issuer of the financial instrument or the financial institution that hosts the selected payment account.

In step 440, the issuer/financial may approve the transaction. In one embodiment, the issuer/financial institution may require additional authentication from the customer. For example, if the transaction is above a certain amount, with a certain type of merchant, for a particular product, appears fraudulent, etc., the issuer/financial institution may require additional authentication.

In step 445, the issuer/financial institution may provide payment confirmation to the merchant and/or the mobile device. In one embodiment, payment confirmation may not include information regarding the financial instrument or account that was used to complete the payment. Rather, it provides the merchant and/or mobile device with confirmation that the issuer/financial institution has approved the transaction, and the merchant will receive funds for the transaction.

In one embodiment, the confirmation may be provided directly to the merchant. For example, the merchant point-of-sale device, terminal, etc. that is involved in the transaction may receive the payment confirmation, directly or indirectly, from the merchant.

In another embodiment, the payment confirmation may be provided to a trusted site, to a secure location in the cloud, etc. For example, the issuer may host a payment confirmation site that the merchant may access and pull payment confirmation from.

In still another embodiment, the issuer/financial institution may provide the mobile payment application with confirmation of the transaction, and the mobile payment application may provide the confirmation to the merchant. For example, the confirmation may be in the form of a machine-readable code (e.g., a QR code), a RF transmission, etc. that my provide a link to a payment confirmation, etc.

In one embodiment, payment confirmation may be provided to both the merchant and the mobile payment application.

In step 450, the transaction may be complete. In one embodiment, the customer may be provided with a receipt (paper, electronic, etc.). For example, an electronic receipt may be provided to the mobile payment application.

In one embodiment, the receipt may include an identifier for the account that was used in the transaction, such as the last four digits of the account number, etc.

Figure 5:
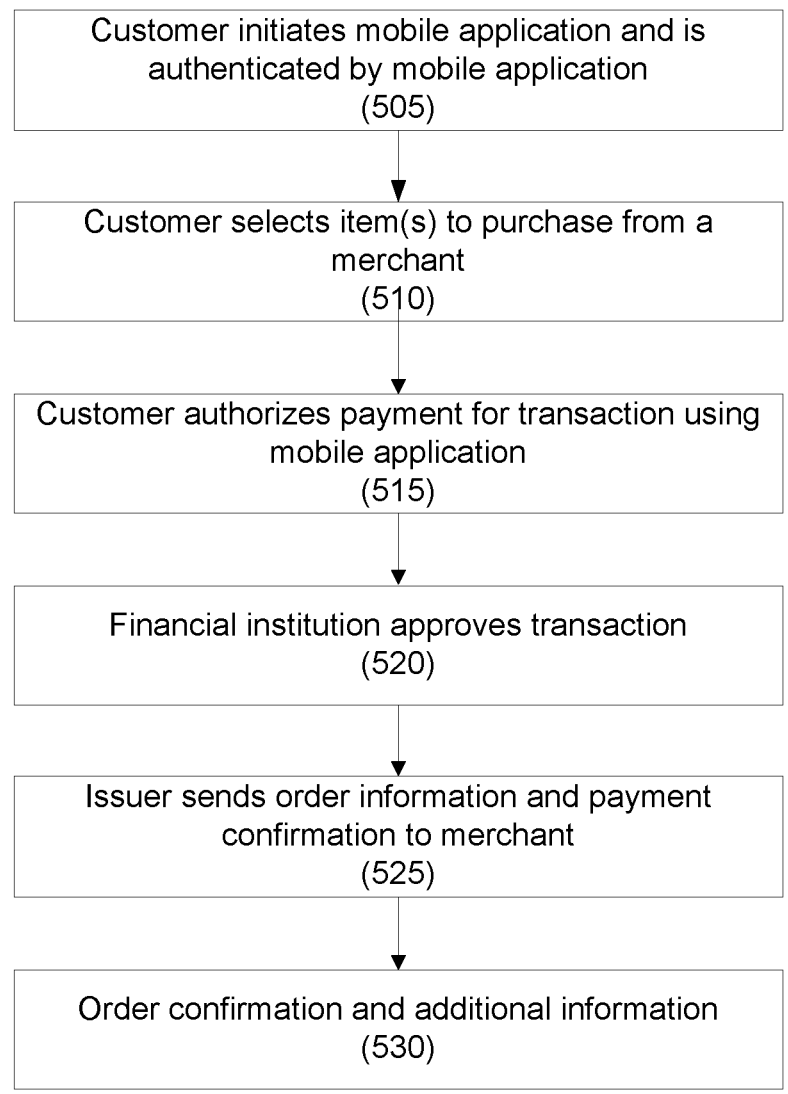
FIG. 5 depicts a method for cloud-based payment according to one embodiment.

Referring to FIG. 5, a method for conducting a cloud-based transaction is provided.

In step 505, the customer may initiate a mobile payment application and may be authenticated by the mobile payment application. In one embodiment, the mobile application may be provided by, or associated with, a financial institution.

In one embodiment, the mobile payment application may provide closed-loop payment functionality (e.g., no third party acquirer may be used). Examples of such payment mechanisms are provided in U.S. patent application Ser. Nos. 14/699,511, 14/744,608, and 15/131,979, the disclosures of which are hereby incorporated, by reference, in their entireties.

In step 510, the customer may select an item for purchase. In one embodiment, the customer may enter a code that is associated with an item, such as a QR code, that may be provided in marking material, circulars, mailings, on-line, billboards, magazines, etc. to the financial institution's application. In one embodiment, the code may include a product code for the item, a merchant identifier, a manufacturer identifier (if the item is to be purchased directly from the manufacturer), etc. If necessary, the customer may enter size information, color information, quantity information, etc. as necessary and/or desired.

In one embodiment, the financial institution may confirm product availability, pricing, etc. based on the merchant identifier. In one embodiment, the financial institution may determine if the same item may be procured from a different merchant for a lower price, less expensive/quicker shipping, etc.

In one embodiment, the communication with the merchant(s) or manufacturers may be performed without the customer realizing this is happening.

In step 515, the customer may authorize payment using the mobile application.

In step 520, the financial may approve the transaction. In one embodiment, the customer may submit the transaction to the financial institution using the financial institution's mobile application or website, and may receive approval from the same.

In one embodiment, the financial institution may require additional authentication from the customer. For example, if the transaction is above a certain amount, with a certain type of merchant, for a particular product, appears fraudulent, etc., the financial institution may require additional authentication from the customer.

In step 525, the financial institution may transmit the order details and payment confirmation to the merchant that will provide the product, such as the merchant identified in the code.

In step 530, the financial institution may provide the mobile application with a receipt for the transaction. Additional information, such as tracking information, etc. may be provided as is necessary and/or desired.

The disclosure of U.S. patent application Ser. Nos. 15/088,437 and 15/069,418 are hereby incorporated, by reference, in their entireties.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for enhanced shopping using a mobile device, comprising:
   in a mobile application executed by a mobile electronic device comprising at least one computer processor, a memory, an optical input, and a display:
      detecting a beacon from a merchant payment system at a merchant location, wherein the beacon transmits merchant identification information;
      establishing a communication link with the merchant payment system using the merchant identification information;
      capturing via the optical input one or more images of either an item for purchase or a machine-readable code associated with the item;
      determining an item identifier associated with the item based on the one or more images;
      retrieving item data for the item from the merchant payment system based on the item identifier;
      displaying the item data on the display;
      receiving purchase confirmation for the desired item;
      communicating payment information for the item to the merchant payment system; and
      completing the purchase of the item.

2. The method of claim 1, wherein the step of associating with a merchant system comprises:
   the mobile application registering with the merchant payment system.

3. The method of claim 1, wherein the payment information comprises a payment token.

4. The method of claim 1, further comprising:
   receiving a payment confirmation from the merchant payment system.

5. A method for enhanced shopping in a physical store using a mobile device, comprising:
   in a merchant payment system comprising at least one computer processor and a memory:
      associating unique identifiers with one or more items offered for sale;
      using a beacon, broadcasting a merchant payment system identifier;
      establishing a communication link with a responding mobile application executed by a mobile electronic device;
      receiving, from the mobile application, an identifier for an item;
      providing item data for the item to the mobile application;
      receiving purchase confirmation for the item from the mobile application;
      receiving payment information for the item from the mobile application;
      recording that the item has been purchased;
      detecting an identifier associated with an item removed from the store;
      determining whether the identifier associated with the item removed from the store corresponds to a purchased item; and
      notifying the merchant if the item removed from the store does not correspond to a purchased item.

6. The method of claim 5, wherein the payment information comprises a payment token.

7. The method of claim 5, further comprising:
communicating a payment confirmation to the mobile application.

8. The method of claim 5, further comprising:
the merchant payment system deactivating a security feature for the item.

9. The method of claim 8, wherein the security feature comprises a RFID tag associated with the item.

10. A system for enhanced shopping using a mobile device, comprising:
a merchant payment system for a merchant comprising at least one computer processor and a memory;
an application executed by a mobile electronic device that comprises at least one computer processor, a memory, an optical input, and a display; and
at least one database comprising item information for a plurality of items offered for sale by the merchant;
wherein the mobile application:
detects a beacon from the merchant payment system, wherein the beacon transmits merchant identification information;
associates itself with the merchant system using the merchant identification information;
captures via the optical input one or more images of either an item or a machine-readable code associated with an item;
determines an item identifier associated with the item based on the one or more images;
retrieves item data for the item from the merchant payment system based on the item identifier;
receives purchase confirmation for the item;
communicates payment information for the item to the merchant payment system; and
completes the purchase of the item.

11. The system of claim 10, wherein the association between the mobile application and the merchant payment system comprises a communication link between the mobile application and the merchant payment system.

12. The system of claim 10, wherein the association between the mobile application and the merchant payment system is established by the mobile application registering with the merchant payment system.

13. The system of claim 10, wherein the payment information comprises a payment token.

14. The system of claim 10, wherein at least one of the plurality of items comprises a security feature that is deactivated when the payment information is received.

15. The system of claim 14, wherein the security feature comprises a RF tag.

16. The system of claim 15, wherein the merchant adds a RF tag identifier to a list of items after payment information is received, wherein the RF tag identifier causes a security alert not to trigger.

17. The system of claim 15, wherein the merchant removes a RF tag identifier from a list of items after payment information is received, wherein the RF tag identifier triggers a security alert.

\* \* \* \* \*